UNITED STATES PATENT OFFICE.

ELISHA ROYALTY, OF BOHON, KENTUCKY.

IMPROVEMENT IN REMEDIES FOR HOG-CHOLERA.

Specification forming part of Letters Patent No. 174,157, dated February 29, 1876; application filed December 23, 1875.

*To all whom it may concern:*

Be it known that I, ELISHA ROYALTY, of Bohon, in the county of Mercer and in the State of Kentucky, have invented certain new and useful Improvements in Medical Compounds; and do hereby declare that the following is a full, clear, and exact description thereof.

The nature of my invention consists in a medical compound for the cure of the disease known as "hog-cholera," as will be hereinafter more fully set forth.

By close and long-continued observation, I have found that the malady with which so many hogs in the United States are affected, and known as hog-cholera, is simply lung-fever and congestion of the portal circulation, and by repeated experiments I have succeeded in finding a remedy that will cure the same.

I make use of the following ingredients, viz: Calomel, podophyllin, flowers of sulphur, castor-oil, spirits of turpentine, pulverized ginger, and pulverized black pepper, which are to be given in the following manner: Thirty grains of calomel and two grains of podophyllin are mixed in warm water, to which is added two ounces of castor-oil and half a teaspoonful of spirits of turpentine.

Should the bowels be inclined to act too freely, I use the following as an astringent, viz: Pulverized ginger and pulverized black pepper, each one teaspoonful, mixed in warm water, and given two or three times per day until the bowels are checked. Then I give the hog one teaspoonful of flowers of sulphur in warm water morning and evening until the appetite fully returns, which will be in a short time.

These medicines may be given in slop made of bran, or slop from the kitchen if the hog has appetite enough to eat it. Otherwise they have to be drenched with the remedies. The hog should be kept dry and out of the dust, and allowed no water until his appetite returns.

Having thus fully described my invention, what I claim as new, and desire to secure by Letters Patent, is—

A medical composition consisting of calomel, podophyllin, castor-oil, and spirits of turpentine, as and for the purposes herein set forth.

In testimony that I claim the foregoing I have hereunto set my hand this 17th day of December, 1875.

ELISHA + ROYALTY.
his mark.

Witnesses:
N. RUE,
GEO. O. HERNDEN.